United States Patent
Kang et al.

(10) Patent No.: US 12,000,498 B2
(45) Date of Patent: Jun. 4, 2024

(54) VALVE ACTUATOR

(71) Applicant: LG ELECTRONICS INC., Seoul (KR)

(72) Inventors: Joohang Kang, Seoul (KR); Youngchan Ahn, Seoul (KR); Deokkyu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 17/883,818

(22) Filed: Aug. 9, 2022

(65) Prior Publication Data
US 2023/0054114 A1 Feb. 23, 2023

(30) Foreign Application Priority Data
Aug. 19, 2021 (KR) .......................... 10-2021-0109661

(51) Int. Cl.
*F16K 31/04* (2006.01)
*F16K 1/14* (2006.01)
*F16K 31/53* (2006.01)

(52) U.S. Cl.
CPC .............. *F16K 31/045* (2013.01); *F16K 1/14* (2013.01); *F16K 31/535* (2013.01)

(58) Field of Classification Search
CPC ............................. F16K 31/045; F16K 31/535
USPC .................................................... 251/129.12
See application file for complete search history.

(56) References Cited

U.S. PATENT DOCUMENTS

| 2,459,092 | A | | 1/1949 | Peterson et al. |
| 5,131,623 | A | * | 7/1992 | Giordani ............... F16K 31/045 |
| | | | | 251/129.11 |
| 5,916,325 | A | | 6/1999 | Madrid et al. |

FOREIGN PATENT DOCUMENTS

| DE | 10122272 | 11/2002 |
| JP | 2007-002846 | 1/2007 |
| JP | 2015-161371 | 9/2015 |
| JP | 2020-133897 | 8/2020 |
| KR | 10-2001-0103145 | 11/2001 |
| KR | 10-0750404 | 8/2007 |
| KR | 10-0815162 | 3/2008 |
| KR | 20090073402 | 7/2009 |

OTHER PUBLICATIONS

Search Report in European Appln. No. 22189789.5, dated Jan. 4, 2023, 9 pages.
Notice of Allowance in Korean Appln. No. 10-2021-0109661, dated Jul. 1, 2023, 4 pages (with English translation).

* cited by examiner

*Primary Examiner* — Reinaldo Sanchez-Medina
*Assistant Examiner* — Nicole Gardner
(74) *Attorney, Agent, or Firm* — Fish & Richardson P.C.

(57) ABSTRACT

A valve actuator includes a motor and a gear assembly that receives driving force of the motor and controls a valve. In the gear assembly, a power transmission gear for transmitting rotational force of an input gear to an output gear includes a selective power transmission unit. When the output gear is in physical contact with a stopper, the power transmission gear transmits the rotational force of the input gear to the output gear is blocked. Accordingly, even after the valve is actuated to close a path, the rotational force of the input gear is not transmitted to the output gear even though the motor is continuously driven.

18 Claims, 9 Drawing Sheets

VALVE ACTUATOR

CROSS-REFERENCE TO RELATED APPLICATION

This application claims priority to and the benefit of Korean Patent Application No. 10-2021-0109661 filed in the Korean Intellectual Property Office on Aug. 19, 2021, which is incorporated herein by reference for all purposes as if fully set forth herein.

TECHNICAL FIELD

The present disclosure relates to a valve actuator for automatically opening/closing a valve, and more particularly, to a valve actuator having an over-torque interruption function.

BACKGROUND

Refrigerant is essentially used in an air conditioner which is one of the air conditioning devices, and Freon gas used as the refrigerant acts as a factor of global warming.

Therefore, in recent years, refrigerant has been developed, which is not concerned with the global warming, and the newly developed refrigerant does not act as the factor of the global warming, but there is a risk of a fire in the case of refrigerant leakage due to an ignition propensity, and as a result, a valve actuator for automatically actuating a valve for interrupting leakage in the case of the refrigerant leakage has been developed.

Figure 1:
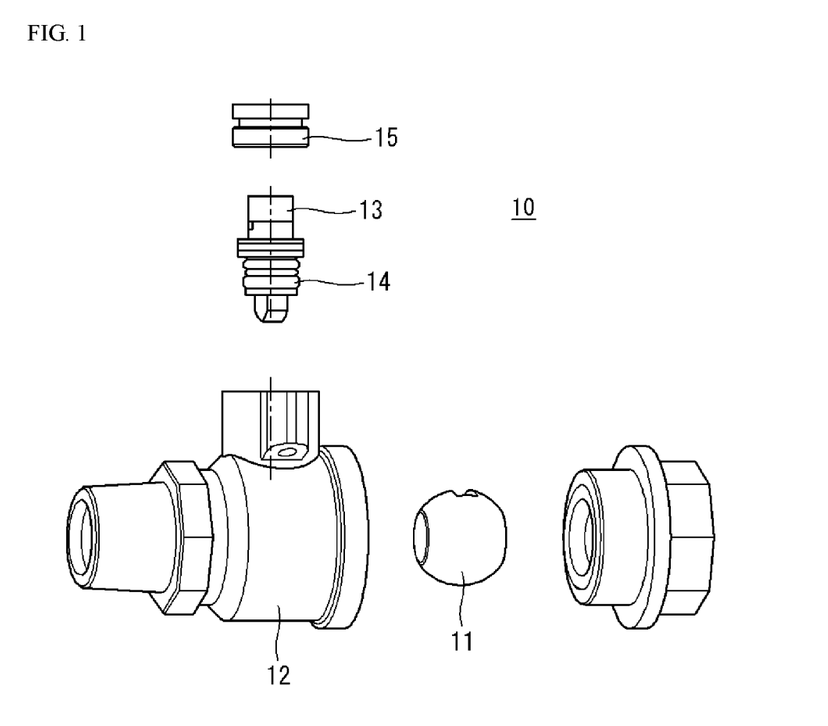
FIG. 1 is an exploded perspective view illustrating a configuration of a general ball valve.

As a valve installed between an outdoor unit and an indoor unit of the air conditioner and preventing the refrigerant leakage, a ball valve is primarily used, and as illustrated in FIG. 1, a ball valve 10 includes a ball 11 with a path, a pipe 12 into which the ball 11 is inserted, a stem 13 connected to the pipe 12, a seal member 14 installed in the stem 13, and a stem fixation bolt 15.

A valve actuator for controlling the ball valve having such a configuration generally includes a motor and a gear assembly, and controls the valve by controlling rotation of the motor by using a sensor such as a limit switch, etc., or controlling the rotation of the motor by using a step motor.

In some examples, a valve actuator is configured in such a manner that when a projection portion of an output gear connected to the stem of the ball valve among a plurality of gears provided in the gear assembly rotates at 90 degrees or more, an electronic limit switch is pressed to stop the motor.

However, the valve actuator in these examples having the electronic limit switch has a problem in that sensors' peculiar instability in a harsh environment.

SUMMARY

The present disclosure provides a valve actuator capable of securing durability and driving stability.

The present disclosure also provides a valve actuator removing instability of an electronic sensor.

The present disclosure also provides a valve actuator which need not include a separate PCB for a motor stop signal.

The objects of the present disclosure are not limited to the above-mentioned objects, and other objects and advantages of the present disclosure that are not mentioned can be understood by the following description, and will be more clearly understood by embodiments of the present disclosure.

Further, it will be readily appreciated that the objects and advantages of the present disclosure can be realized by means and combinations shown in the claims.

Particular implementations of the present disclosure provide a valve actuator including a motor and a gear assembly configured to receive a driving force of the motor and control a valve. The gear assembly includes a first gear coupled to a rotational shaft of the motor and configured to receive the driving force of the motor, a second gear coupled to the valve and configured to transmit a rotational force of the first gear to the valve, and at least one power transmission gear configured to transmit the rotational force of the first gear to the second gear. The at least one power transmission gear includes a third gear configured to, based on a rotational angle of the second gear, selectively block the rotational force of the first gear being transmitted to the second gear.

In some implementations, the valve actuator can optionally include one or more of the following features. The valve actuator may include a case that receives the gear assembly and the motor. The gear assembly may be housed inside the case. The valve actuator may include at least one stopper configured to limit the rotational angle of the second gear. The at least one stopper may include a first stopper configured to limit a clockwise-direction rotational angle of the second gear and a second stopper configured to limit a counterclockwise-direction rotational angle of the second gear. The first and second stoppers may be housed inside the case. The third gear may be configured to, based on the second gear rotating and physically contacting the at least one stopper, block power transmission of the first gear and the second gear. The gear assembly may be configured to reduce a speed based on the rotational force of the first gear being transmitted to the second gear through the at least one power transmission gear. The third gear may include an outer wheel portion and an inner wheel portion positioned at an inner side of the outer wheel portion. The outer wheel portion and the inner wheel portion may be connected by a selective power transmission unit. The selective power transmission unit may include a plurality of concave portions and a plurality of convex portions that are alternately positioned at an outer circumferential surface of the inner wheel portion, and balls positioned at the plurality of concave portions and elastically pressed toward a center of the inner wheel portion. The outer wheel portion may include a plurality of spring installation portions that position a plurality of springs. The plurality of springs may be configured to elastically press the balls. The plurality of concave portions, and the plurality of convex portions, the balls, and the plurality of spring installation portions may be provided in even numbers. The plurality of convex portions, the plurality of convex portions, the balls, and the plurality of spring installation portions may be arranged to be symmetric to each other around the inner wheel portion. The third gear may be directly coupled to the first gear. The outer wheel portion may include an outer-wheel tooth portion engaged with a first-gear tooth portion of the first gear. The inner wheel portion may include an inner-wheel tooth portion positioned below the outer-wheel tooth portion. The at least one power transmission gear may include a fourth gear coupled to the third gear, and a fifth gear coupled to each of the fourth gear and the second gear. The fourth gear may include a first fourth-gear tooth portion coupled to a third-gear tooth portion of the third gear, and a second fourth-gear tooth portion positioned below the first fourth-gear tooth portion. The fifth gear may include a first fifth-gear tooth portion coupled to the second fourth-gear tooth portion of the fourth gear, and a second fifth-gear tooth portion positioned above the first fifth-gear tooth portion. The second gear may include a second-gear tooth portion coupled to the second fifth-gear tooth portion of the fifth gear. The second-gear tooth portion of the second gear may include an arc shape. The at least one stopper may be configured to, based on the second gear rotating, contact a side surface of the second-gear tooth portion of the second gear that includes the arc shape. The second gear may include a stem coupling portion that couples a stem of the valve.

A valve actuator according to an exemplary embodiment of the present disclosure including: a motor; and a gear assembly receiving driving force of the motor and controlling a valve, in which in the gear assembly, a power transmission gear transmitting rotational force of an input gear to an output gear includes a selective power transmission unit, and the selective power transmission unit selectively blocks the rotational force of the input gear transmitted to the output gear according to a rotational angle of the output gear.

The valve actuator may further include a case in which the gear assembly and the motor are installed.

The gear assembly may be installed inside the case.

The valve actuator may further include a stopper limiting a rotational angle of the second gear.

At least one stopper of a stopper for limiting a clockwise-direction rotational angle of the second gear and a stopper for limiting a counterclockwise-direction rotational angle of the second gear may be installed inside the case.

The third gear may block power transmission of the first gear and the second gear when the second gear rotates and physically contacts the stopper.

While the rotational force of the first gear is transmitted to the second gear through the power transmission gear, a speed may be reduced by the gear assembly.

The third gear may include an outer wheel portion and an inner wheel portion installed at an inner side of the outer wheel portion, and the outer wheel portion and the inner wheel portion may be connected by a selective power transmission unit.

The selective power transmission unit may include a plurality of concave portions and a plurality of convex portions alternately formed on an outer circumferential surface of the inner wheel portion, and balls positioned at the plurality of concave portions, and elastically pressed toward a center of the inner wheel portion.

The outer wheel portion may include a plurality of spring installation portions in which springs elastically pressing the balls are installed.

Each of the number of concave portions and the number of convex portions of the inner wheel portion, the number of balls, and the number of spring installation portions of the outer wheel portion may be provided as an even number.

The convex portion and the convex portion of the inner wheel portion, the ball, and the spring installation portion of the outer wheel portion may be arranged at locations symmetric to each other, respectively around the inner wheel portion.

The third gear may be directly coupled to the first gear.

The outer wheel portion may include a first tooth portion engaged with a tooth portion of the first gear, and the inner wheel portion includes a second tooth portion positioned below the first tooth portion.

The power transmission gear may further include a fourth gear coupled to the third gear and a firth gear coupled to each of the fourth gear and the second gear.

The fourth gear may include a first tooth portion coupled to a second tooth portion of the third gear and a second tooth portion positioned below the first tooth portion.

The fifth gear may include a first tooth portion coupled to the second tooth portion of the fourth gear, and a second tooth portion positioned above the first tooth portion.

The second gear may include a tooth portion coupled to a second tooth portion of the fifth gear.

The tooth portion of the second gear may be formed in an arc shape.

When the second gear rotates, the stopper may be in contact with a side surface of the tooth portion of the second gear formed in the arc shape.

The second gear may further include a stem coupling portion to which a stem of the valve is coupled.

Accordingly, the rotational force of the input gear is not transmitted to the output gear even though the motor is continuously driven.

According to the present disclosure, while the motor is continuously driven even after the valve is closed by the valve actuator, the rotation of the output gear is prevented by the selective power transmission unit, to prevent the motor and/or the gear assembly from being damaged due to an over-torque and apply a motor of a type in which RPM control is inaccurate.

In addition, since the electronic sensor is not used, the instability of the electronic sensor can be removed, and a separate PCB for a motor stop signal need not be provided, thereby increasing durability, and improving complexity and material cost.

In addition to the above-described effects, the specific effects of the present disclosure will be described below together while describing the specific matters for the present disclosure

DETAILED DESCRIPTION

The present disclosure will be described more fully hereinafter with reference to the accompanying drawings, in which exemplary embodiments of the invention are shown.

The present disclosure can be realized in various different forms, and is not limited to the exemplary embodiments described herein.

A part irrelevant to the description will be omitted to clearly describe the present disclosure, and the same elements will be designated by the same reference numerals throughout the specification. Further, some exemplary embodiments of the present disclosure will be described in detail with reference to illustrative drawings.

When reference numerals refer to components of each drawing, although the same components are illustrated in different drawings, the same components are denoted by the same reference numerals as possible. Further, in describing the present disclosure, a detailed description of known related configurations and functions may be omitted to avoid unnecessarily obscuring the subject matter of the present disclosure.

In describing the component of the present disclosure, when it is disclosed that any component is "connected", "coupled", or "linked" to other components, it should be understood that another component may be "interposed" between respective components or the respective components may be "connected", "coupled", or "linked" through another component.

Figure 2:
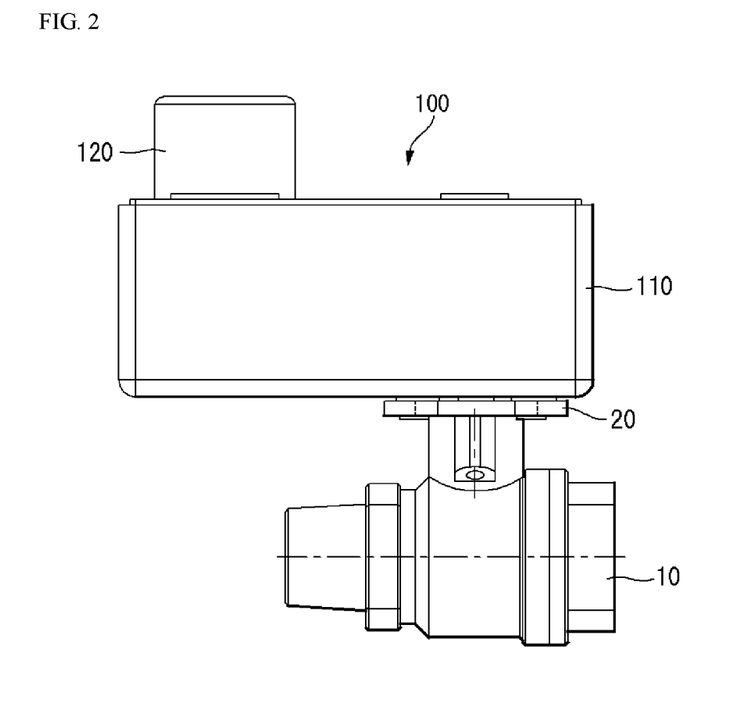
FIG. 2 is a diagram illustrating a coupling state of a valve actuator and a ball valve according to an exemplary embodiment of the present disclosure.
Figure 3:
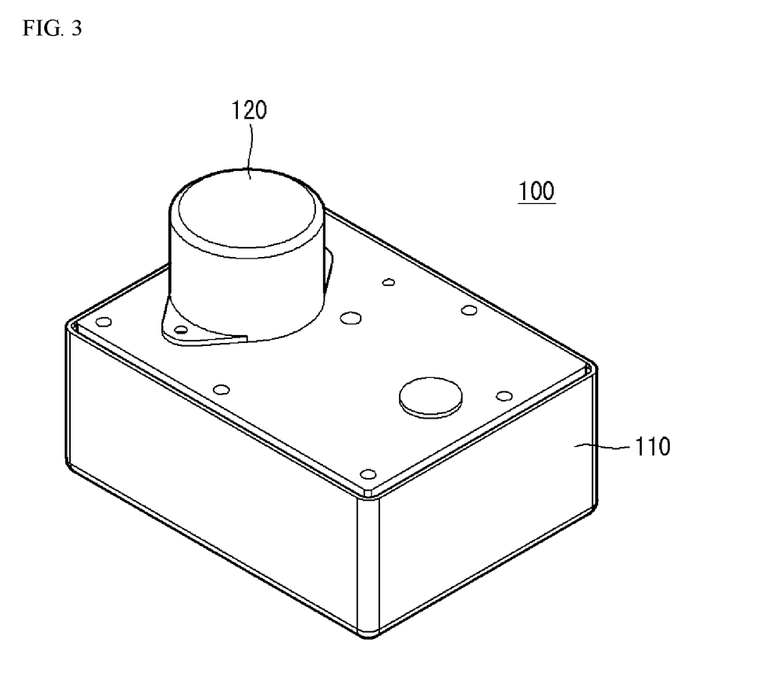
FIG. 3 is an exterior perspective view of the valve actuator illustrated in FIG. 2.

FIG. 2 is a diagram illustrating a coupling state of a valve actuator and a ball valve according to an exemplary embodiment of the present disclosure and FIG. 3 is an exterior perspective view of the valve actuator illustrated in FIG. 2.

As illustrated, in order to install the valve actuator 100 in the ball valve 10, a plate 20 may be installed above the ball valve 10, and the valve actuator 100 may be coupled to the plate 20.

The plate 20 may be fixed to an upper end of the ball valve 10 by a fastening member such as a fastening screw, etc., and the valve actuator 100 may be fixed to the plate 20 by the fastening member such as the fastening screw, etc.

The valve actuator 100 includes a case 110.

The case 110 provides a space in which a motor 120 and a gear assembly 130 provided in the valve actuator 100 are installed, the motor 120 is installed on an upper surface of the case 110 outside the case 110, and the gear assembly 130 is disposed in an internal space of the case 110.

The motor 120 may be a motor of a type in which RPM control is accurate. However, this is not required, and the motor 120 may be a motor of a type in which the RPM control is inaccurate. That is, since the valve actuator according to the exemplary embodiment of the present disclosure may selectively transmit power by a mechanical structure, damage to the gear assembly may be prevented and the ball valve may be accurately controlled while using the motor of the type in which the RPM control is inaccurate.

Figure 4:
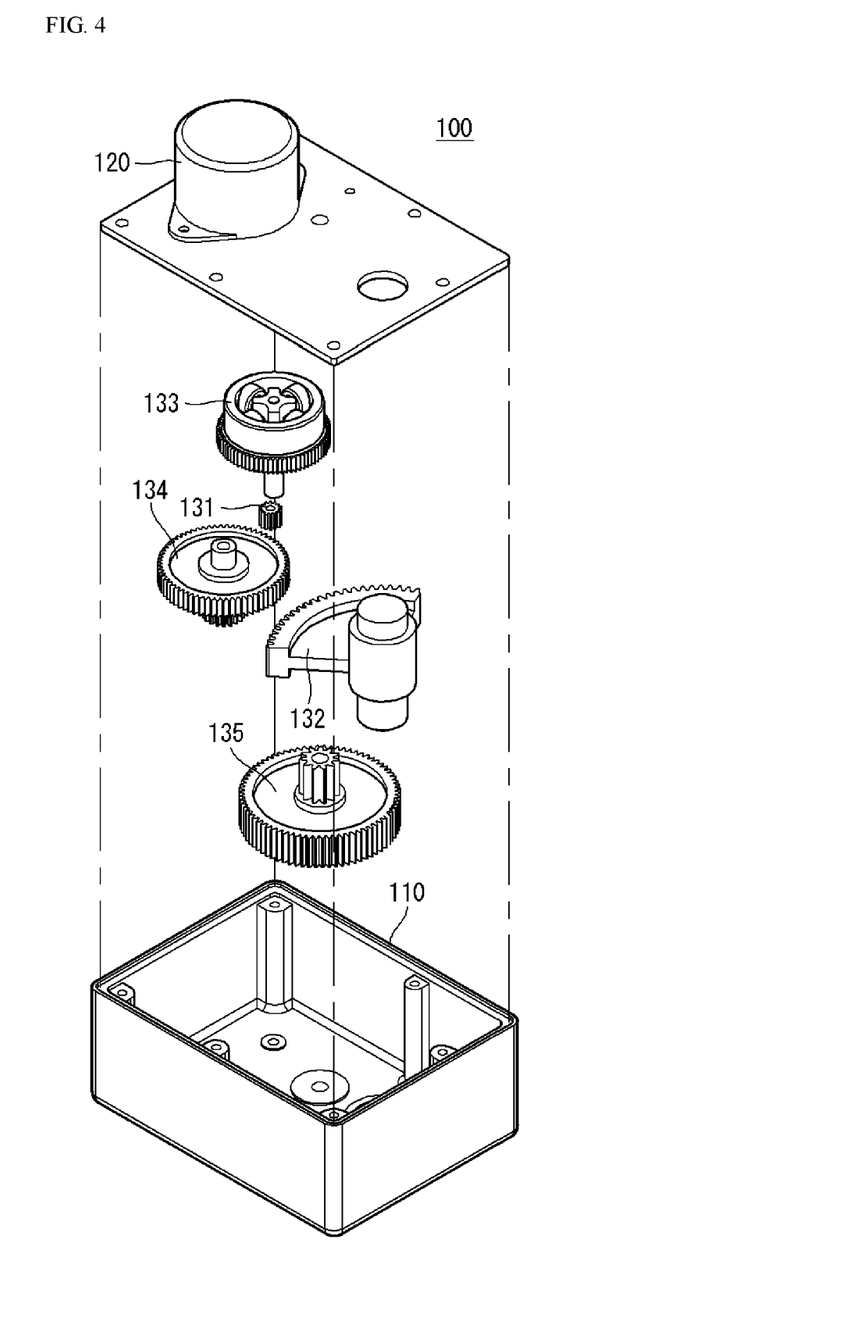
FIG. 4 is an exploded perspective view of the valve actuator illustrated in FIG. 3.
Figure 5:
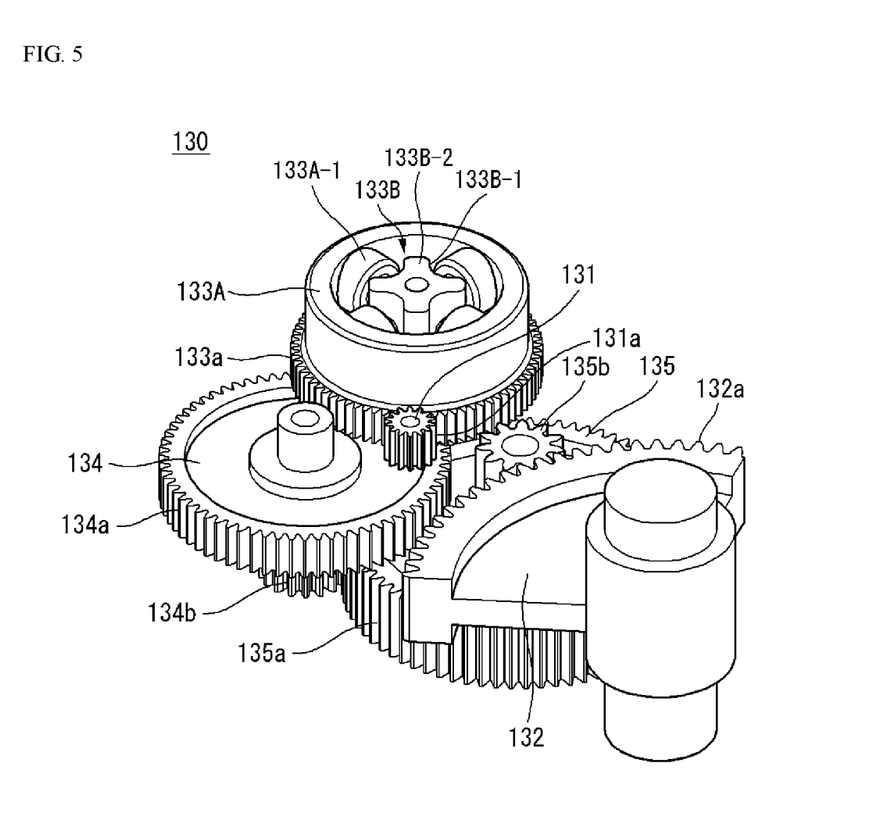
FIG. 5 is a perspective view illustrating a coupling state of a gear assembly illustrated in FIG. 4.
Figure 6:
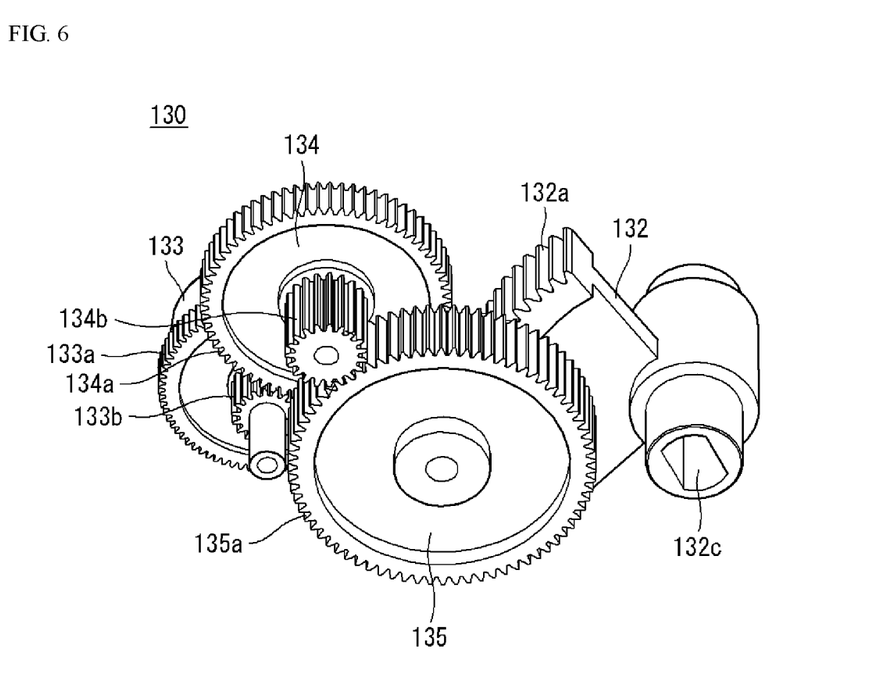
FIG. 6 is a bottom perspective view of the gear assembly illustrated in FIG. 5.

FIG. 4 is an exploded perspective view of the valve actuator illustrated in FIG. 3, FIG. 5 is a perspective view illustrating a coupling state of a gear assembly illustrated in FIG. 4, and FIG. 6 is a bottom perspective view of the gear assembly illustrated in FIG. 5.

Figure 7:
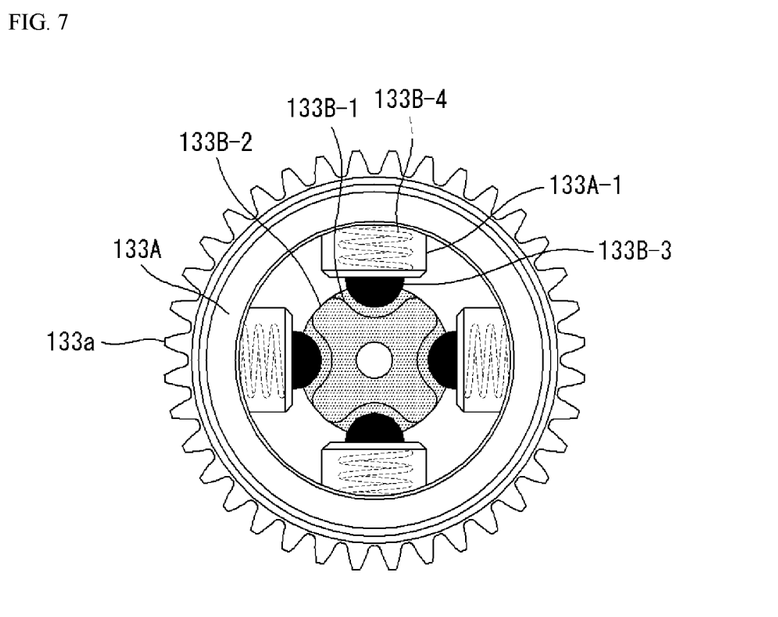
FIG. 7 is a view illustrating a state in which an inner wheel portion and an outer wheel portion integrally rotate as a plan view of a third gear provided in the gear assembly illustrated in FIG. 4.
Figure 8:
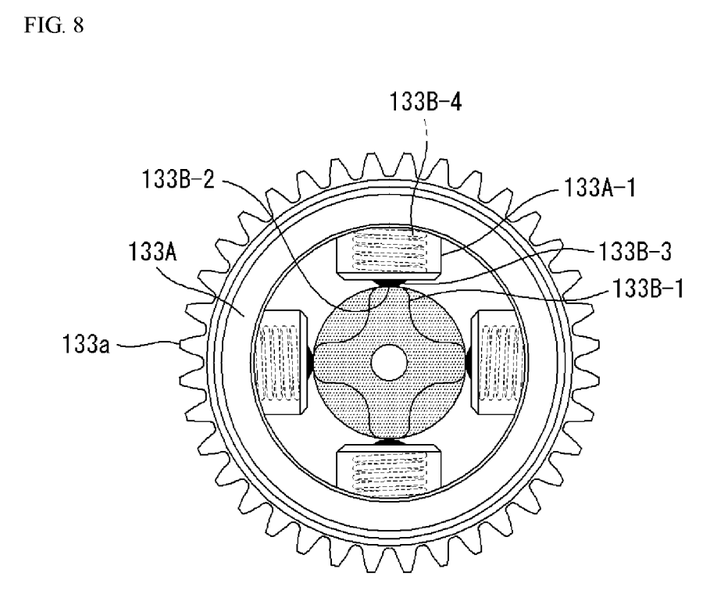
FIG. 8 is a view illustrating a state in which power transmission of the inner wheel portion and the outer wheel portion is blocked as the plan view of a third gear provided in the gear assembly illustrated in FIG. 4.

In addition, FIG. 7 is a view illustrating a state in which an inner wheel portion and an outer wheel portion integrally rotate as a plan view of a third gear provided in the gear assembly illustrated in FIG. 4 and FIG. 8 is a view illustrating a state in which power transmission of the inner wheel portion and the outer wheel portion is blocked as the plan view of a third gear provided in the gear assembly illustrated in FIG. 4.

As illustrated, the gear assembly 130 includes a first gear 131 coupled and/or connected to a rotational shaft of the motor 120 and receiving the driving force of the motor 120, a second gear 132 coupled to a stem 13 of the ball valve 10 and transmitting rotational force of the first gear 131 to the stem 13 of the ball valve 10 and at least one power transmission gear transmitting the rotational force of the first gear 131 to the second gear 132.

Hereinafter, it will be described as an example that the power transmission gear is constituted by third to fifth gears, but the number of power transmission gears may be appropriately changed.

In addition, in the exemplary embodiment, while the rotational force of the first gear is transmitted to the second gear through the power transmission gear, a speed is reduced by the gear assembly or the power transmission gear.

The first gear 131 includes a tooth portion 131a.

The third gear 133 directly coupled to the first gear 131 includes an outer wheel portion 133A and an inner wheel portion 133B installed at an inner side of the outer wheel portion 133A, and the outer wheel portion 133A and the inner wheel portion 133B are connected by a selective power transmission unit.

Accordingly, by the selective power transmission unit, the inner wheel portion 133B may also rotate integrally with the outer wheel portion 133A, and while the inner wheel portion 133B does not rotate, only the outer wheel portion 133A may also rotate.

In the exemplary embodiment of the present disclosure, the selective power transmission unit includes a plurality of concave portions 133B-1 and a plurality of convex portions 133B-2 alternately formed on an outer circumferential surface of the inner wheel portion 133B, balls 133B-3 positioned at the plurality of concave portions 133B-1, and elastically pressed toward a center of the inner wheel portion 133B, and springs 133B-4 elastically pressing the ball 133B-3.

In addition, the outer wheel portion 133A includes a plurality of spring installation portions 133A-1 in which the springs 133B-4 elastically pressing the balls 133B-3 are installed, respectively.

Each of the number of concave portions 133B-1, the number of convex portions 133B-2, and the number of balls 133B-3, the number of spring installation portions 133A-1 of the outer wheel portion 133A, etc., may be provided as four as illustrated, but this is not limitative, and preferably, each may be provided as two or more.

The number of concave portions 133B-1, the number of convex portions 133B-2, and the number of balls 133B-3, and the number of spring installation portions 133A-1 of the outer wheel portion 133A may increase or decrease as large as required spring force.

In addition, when each of the number of concave portions 133B-1 and the number of convex portions 133B-2 of the inner wheel portion 133B, the number of balls 133B-3, the number of spring installation portions 133A-1 of the outer wheel portion 133A, etc., is provided as even number such as 2, 4, 6, etc., the concave portions 133B-1 and the convex portions 133B-2, the balls 133B-3, and the spring installation portions 133A-1 may be arranged at symmetric locations around the inner wheel portion 133B.

In addition, the spring 133B-4 has spring force of a degree of being compressed when the second gear 132 rotates in a clockwise direction or counterclockwise direction and is in physical contact with the stopper 140, and then a torque value of a radial conversion torque or more of the spring force is applied.

The outer wheel portion 133A includes a first tooth portion 133a physically directly coupled to the tooth portion 131a of the first gear 131 and the inner wheel portion 133B includes a second tooth portion 133*b* disposed below the first tooth portion 133*a* on an axis of the third gear 133.

A first tooth portion 134*a* of a fourth gear 134 is directly physically coupled to the second tooth portion 133*b* of the third gear 133, and the second tooth portion 134*b* is positioned below the first tooth portion 134*a* on the axis of the fourth gear 134.

In addition, a fifth gear 135 includes a first tooth portion 135*a* physically directly coupled to the second tooth portion 134*b* of the fourth gear 134, and a second tooth portion 135*b* positioned above the first tooth portion 135*a* on the axis of the fifth gear 135, and a tooth portion 132*a* of the second gear 132 is physically directly coupled to the second tooth portion 135*b* of the fifth gear 135.

The tooth portion of the second gear 132 may be formed in an arc shape.

Meanwhile, the second gear 132 further includes a stem coupling portion 132*c* coupled to a stem 13 of the ball valve 10.

Accordingly, when the motor 120 is actuated, the driving force of the motor 120 is transmitted to the output gear 132 sequentially through the first gear 131, the third gear 133, the fourth gear 134, and the fifth gear 135, and appropriate speed reduction is made during the power transmission process.

Hereinafter, the actuation of the valve actuator according to an exemplary embodiment of the present disclosure will be described with reference to FIGS. 7 to 11.

Figure 9:
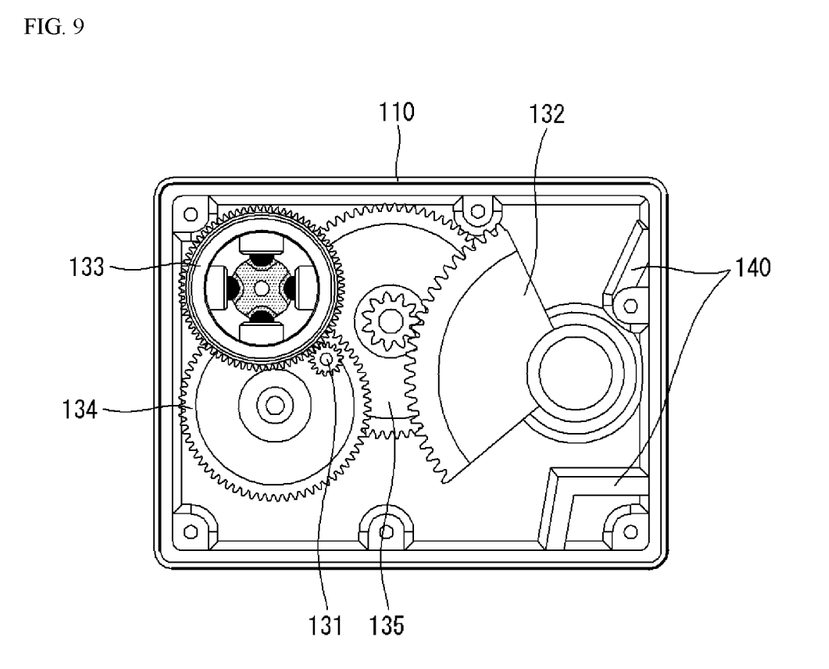
FIGS. 9 to 11 are views illustrating an operation state of the valve actuator.
Figure 10:
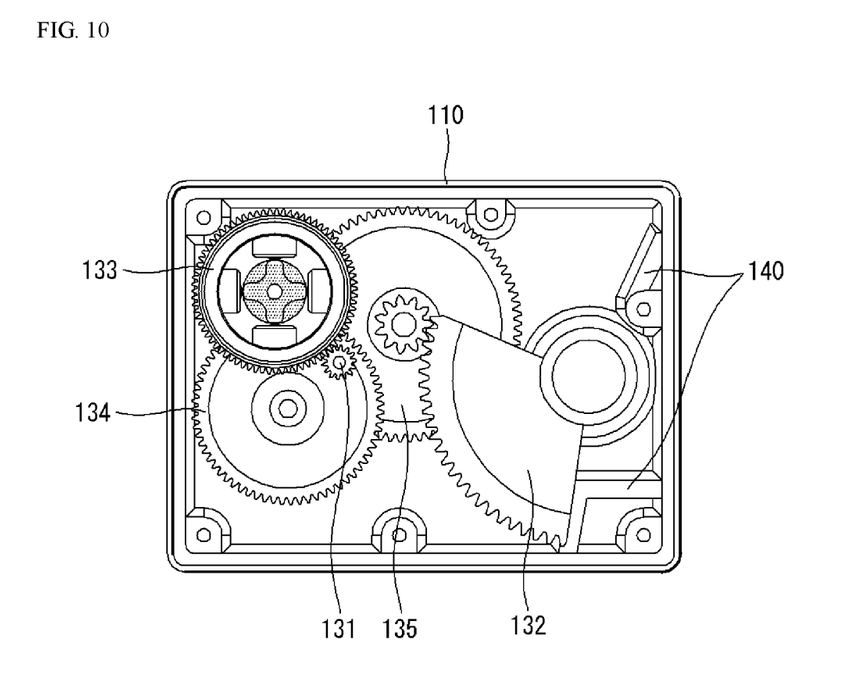
Figure 11:
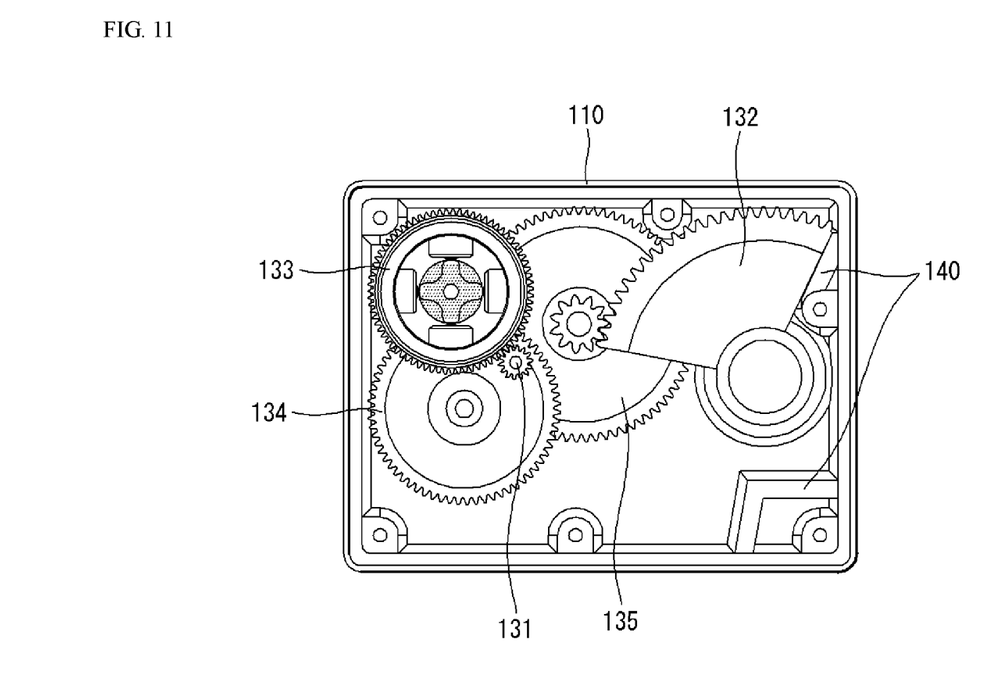

FIG. 9 is a view illustrating an actuation state of the gear assembly within a normal actuation range of the valve actuator, FIG. 10 is a view illustrating the actuation state of the gear assembly when the motor is driven, the second gear rotates in the counterclockwise direction in the state illustrated in FIG. 9, and gear engagement is released, and FIG. 11 is a view illustrating the actuation state of the gear assembly when the motor is driven the second gear rotates in the clockwise direction in the state illustrated in FIG. 9, and the gear engagement is released.

The stopper 140 for physically limiting a rotational angle of the second gear 132 is installed inside the case 110.

FIG. 9 illustrates a state in which two stoppers 140 are installed to limit rotational angles in the clockwise and counterclockwise directions of the second gear 132, respectively, but when the motor 120 is configured to rotate in any one direction of the clockwise direction or the counterclockwise direction, only one stopper 140 may also be installed to limit only the rotational angle in any one direction of the clockwise direction or the counterclockwise direction of the second gear 132.

First, referring to FIGS. 7 and 9, within the normal actuation range of the valve actuator, the ball 133B-3 of the selective power transmission unit is pressed by the spring 133B-4 to be positioned within the concave portion 133B-1 of the inner wheel portion 133B.

Here, the "normal actuation range of the valve actuator" means a state in which driving of the motor 120 is stopped and an initial state in which the motor 120 is driven in order to close the path by controlling the ball valve 10.

Accordingly, when the gas leakage is detected while the ball valve 10 is being used, a driving signal is applied to the motor 120 and the motor 120 is thus driven, and the driving force of the motor 120 is transmitted to the second gear 132 sequentially through the first gear 131, the third gear 133, the fourth gear 134, and the fifth gear 135, and as a result, the second gear 132 rotates in the clockwise direction or the counterclockwise direction and the path of the ball valve 10 is closed.

In addition, as illustrated in FIGS. 8 and 10 to 11, when the second gear 132 rotates at 90 degrees in the clockwise direction or the counterclockwise direction, the second gear 132 is in contact with the stopper 140. A side surface of the arc-shaped tooth portion 132*a* of the second gear 132 is in contact with the stopper 140.

However, in the valve actuator according to the exemplary embodiment of the present disclosure, even after the second gear 132 is in contact with the stopper 140, the driving of the motor 120 is not sopped, but the motor 120 is continuously driven.

In this case, when the torque value of the radial conversion torque or more of the spring force is applied to the third gear 133, the ball 133B-3 installed between the outer wheel portion 133A and the inner wheel portion 133B is pressed while the outer wheel portion 133A of the third gear 133 rotates, and as a result, the ball 133B-3 is positioned at the convex portion 133B-2 of the inner wheel portion 133B while the spring 133B-4 is compressed.

Therefore, the rotational force of the first gear 131 transmitted to the outer wheel portion 133A of the third gear 133 is not transmitted, but blocked.

As such, since the rotational force of the outer wheel portion 133A is selectively transmitted or blocked by the actuation of the selective power transmission unit installed between the outer wheel portion 133A and the inner wheel portion 133B, damage to the motor and/or the gear assembly is prevented due to an over-torque.

In addition, in the valve actuator of the present disclosure, since the spring force is actuated in a radial direction of the gear, durability and driving stability are secured when applying a torque in a gear rotation direction.

In addition, since the valve actuator of the present disclosure need not include a separate electronic switch and a separate PCB for the motor stop signal, the instability of the electronic switch or the electronic sensor is removed, and the complexity and the material cost of the device are improved.

Further, since a contact portion pressing the inner wheel portion is formed in a ball structure, the ball rotates even in high-speed rotation, thereby improving the durability and the driving stability.

Hereinabove, the valve actuator for controlling the ball valve provided in the air conditioner has been described, but the valve actuator according to the present disclosure may be used in a valve for controlling a path of gas or a fluid.

What is claimed is:

1. A valve actuator comprising:
 a motor; and
 a gear assembly configured to receive a driving force of the motor and control a valve,
 wherein the gear assembly includes:
   a first gear coupled to a rotational shaft of the motor and configured to receive the driving force of the motor,
   a second gear coupled to the valve and configured to transmit a rotational force of the first gear to the valve,
   at least one stopper configured to limit a rotational angle of the second gear, and
   at least one power transmission gear configured to transmit the rotational force of the first gear to the second gear,
   wherein the at least one power transmission gear includes a third gear configured to, based on the rotational angle of the second gear, selectively block the rotational force of the first gear being transmitted to the second gear, wherein the third gear is configured to, based on the second gear not contacting the stopper, transmit the driving force of the motor to the second gear through the first gear, and wherein the third gear is configured to, based on the second gear contacting the stopper, block the driving force of the motor from being transmitted to the second gear through the first gear.

2. The valve actuator of claim 1, further comprising:
a case that receives the gear assembly and the motor,
wherein the gear assembly is housed inside the case.

3. The valve actuator of claim 2, wherein the at least one stopper includes a first stopper configured to limit a clockwise-direction rotational angle of the second gear and a second stopper configured to limit a counterclockwise-direction rotational angle of the second gear, the first and second stoppers being housed inside the case.

4. The valve actuator of claim 3, wherein the gear assembly is configured to reduce a speed based on the rotational force of the first gear being transmitted to the second gear through the at least one power transmission gear.

5. The valve actuator of claim 3, wherein the third gear includes an outer wheel portion and an inner wheel portion positioned at an inner side of the outer wheel portion, the outer wheel portion and the inner wheel portion being connected by a selective power transmission unit.

6. The valve actuator of claim 5, wherein the selective power transmission unit includes:
a plurality of concave portions and a plurality of convex portions that are alternately positioned at an outer circumferential surface of the inner wheel portion, and
balls positioned at the plurality of concave portions and elastically pressed toward a center of the inner wheel portion.

7. The valve actuator of claim 6, wherein the outer wheel portion includes a plurality of spring installation portions that position a plurality of springs, the plurality of springs being configured to elastically press the balls.

8. The valve actuator of claim 7, wherein the plurality of concave portions, and the plurality of convex portions, the balls, and the plurality of spring installation portions are provided in even numbers.

9. The valve actuator of claim 8, wherein the plurality of concave portions, the plurality of convex portions, the balls, and the plurality of spring installation portions are arranged to be symmetric to each other around the inner wheel portion.

10. The valve actuator of claim 7, wherein the third gear is directly coupled to the first gear.

11. The valve actuator of claim 10, wherein the outer wheel portion includes an outer-wheel tooth portion engaged with a first-gear tooth portion of the first gear, and
wherein the inner wheel portion includes an inner-wheel tooth portion positioned below the outer-wheel tooth portion.

12. The valve actuator of claim 11, wherein the at least one power transmission gear further includes:
a fourth gear coupled to the third gear, and
a fifth gear coupled to each of the fourth gear and the second gear.

13. The valve actuator of claim 12, wherein the fourth gear includes:
a first fourth-gear tooth portion coupled to a third-gear tooth portion of the third gear, and
a second fourth-gear tooth portion positioned below the first fourth-gear tooth portion.

14. The valve actuator of claim 13, wherein the fifth gear includes:
a first fifth-gear tooth portion coupled to the second fourth-gear tooth portion of the fourth gear, and
a second fifth-gear tooth portion positioned above the first fifth-gear tooth portion.

15. The valve actuator of claim 14, wherein the second gear includes a second-gear tooth portion coupled to the second fifth-gear tooth portion of the fifth gear.

16. The valve actuator of claim 15, wherein the second-gear tooth portion of the second gear includes an arc shape.

17. The valve actuator of claim 16, wherein the at least one stopper is configured to, based on the second gear rotating, contact a side surface of the second-gear tooth portion of the second gear that includes the arc shape.

18. The valve actuator of claim 15, wherein the second gear further includes a stem coupling portion that couples a stem of the valve.

* * * * *